US011598592B2

(12) United States Patent
Suemitsu et al.

(10) Patent No.: US 11,598,592 B2
(45) Date of Patent: Mar. 7, 2023

(54) RADIATIVE COOLING DEVICE AND RADIATIVE COOLING METHOD

(71) Applicant: Osaka Gas Co., Ltd., Osaka (JP)

(72) Inventors: Masahiro Suemitsu, Osaka (JP); Tadashi Saito, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 653 days.

(21) Appl. No.: 16/494,389

(22) PCT Filed: Mar. 1, 2018

(86) PCT No.: PCT/JP2018/007819
§ 371 (c)(1),
(2) Date: Sep. 16, 2019

(87) PCT Pub. No.: WO2018/180177
PCT Pub. Date: Oct. 4, 2018

(65) Prior Publication Data
US 2020/0240725 A1   Jul. 30, 2020

(30) Foreign Application Priority Data

Mar. 28, 2017 (JP) .............................. JP2017-062894
Nov. 13, 2017 (JP) .............................. JP2017-218235

(51) Int. Cl.
*F28F 13/18* (2006.01)
*G02B 5/20* (2006.01)
*G02B 5/26* (2006.01)
*G02B 5/28* (2006.01)

(52) U.S. Cl.
CPC .............. *F28F 13/18* (2013.01); *G02B 5/208* (2013.01); *G02B 5/26* (2013.01); *G02B 5/283* (2013.01)

(58) Field of Classification Search
None
See application file for complete search history.

(56) References Cited

U.S. PATENT DOCUMENTS

| | | | |
|---|---|---|---|
| 2009/0195865 A1 † | 8/2009 | Kleideiter | |
| 2010/0245991 A1 | 9/2010 | Ishihara et al. | |
| 2014/0218792 A1 | 8/2014 | Krogman et al. | |
| 2015/0338175 A1 † | 11/2015 | Raman | |

FOREIGN PATENT DOCUMENTS

| | | | |
|---|---|---|---|
| JP | S636504 A † | 1/1988 | |
| JP | H6194518 A | 7/1994 | |
| JP | H755178 A | 3/1995 | |
| JP | H10291839 A | 11/1998 | |
| JP | 2010237415 A | 10/2010 | |
| WO | 2007101530 A1 | 9/2007 | |
| WO | 2013052927 A2 | 4/2013 | |
| WO | 2015002053 A1 | 1/2015 | |
| WO | 2015190536 A1 | 12/2015 | |

† cited by third party

*Primary Examiner* — Derek S. Chapel
(74) *Attorney, Agent, or Firm* — The Webb Law Firm

(57) ABSTRACT

A radiative cooling device and a radiative cooling method that effectively suppress ultraviolet light absorption. The radiative cooling device includes an ultraviolet reflection layer that reflects ultraviolet light UV, a light reflection layer that reflects visible light and infrared light, and an infrared radiative layer that radiates infrared light IR. Infrared light IR is radiated form a radiative surface. The ultraviolet reflection layer, the infrared radiative layer and the light reflection layer are laminated in this order as viewed from the side of the radiative surface.

13 Claims, 5 Drawing Sheets

RADIATIVE COOLING DEVICE AND RADIATIVE COOLING METHOD

CROSS-REFERENCE TO RELATED APPLICATIONS

This application is the United States national phase of International Application No. PCT/JP2018/007819 filed Mar. 1, 2018, and claims priority to Japanese Patent Application Nos. 2017-062894 and 2017-218235, filed Mar. 28, 2017 and Nov. 13, 2017, respectively, the disclosures of which are hereby incorporated by reference in their entirety.

TECHNICAL FIELD

This invention relates to a radiative cooling device including an ultraviolet reflection layer that reflects ultraviolet light, a light reflection layer that reflects visible light and infrared light, and an infrared radiative layer that radiates infrared light, the radiative cooling device being configured to radiate infrared light from its radiative surface. The invention relates also to a radiative cooling method.

BACKGROUND ART

Radiative cooling refers to a phenomenon in which a temperature of a substance is reduced as the substance radiates (emits) an electromagnetic wave such as infrared radiation to its surroundings. This phenomenon, if effectively utilized, can be used as a "cooling device" that cools an object without consumption of energy such as electricity.

Patent Document 1 discloses a radiative cooling device in which an ultraviolet reflection layer of silicon dioxide or hafnium oxide is formed on a sunlight reflection layer (light reflection layer) made of silver, and on this ultraviolet reflection layer, there is formed an infrared radiative layer made of silicon dioxide and hafnium oxide in a thickness of several μm.

The radiative cooling device of this Patent Document 1 is configured such that ultraviolet light contained in the received sunlight is reflected by the ultraviolet reflection layer and the other lights are reflected mainly by the sunlight reflection layer (light reflection layer) to be released out of the system. Also, a part of the infrared light contained in the received sunlight and heat inputted from the atmosphere, a cooling object, etc. are converted into an infrared light having a predetermined wavelength range through the infrared radiative layer to be released out of the system.

BACKGROUND ART DOCUMENT

Patent Document

Patent Document 1: Detailed disclosure of U.S. Patent Application Publication No. 2015/0338175

SUMMARY OF THE INVENTION

With the conventional radiative cooling device disclosed in Patent Document 1 described above, when sunlight is received, ultraviolet light contained in the sunlight may sometimes be absorbed by the infrared radiative layer and/or the sunlight reflection layer (light reflection layer). Moreover, when a multi-layered structure formed of membranous layers is provided directly on a metal such as silver, in the sunlight reflection layer (light reflection layer), absorption of ultraviolet light may be amplified through surface plasmon resonance by this multi-layered structure.

Thus, with the conventional radiative cooling device, sufficient cooling performance may not be obtained, thus improvement being desired.

The present invention has been made in view of the above-described state of the art and its object is to provide a radiative cooling device and a radiative cooling method that effectively suppress ultraviolet light absorption.

For accomplishing the above-noted object, according to a characterizing feature of a radiative cooling device relating to the present invention, a radiative cooling device comprises an ultraviolet reflection layer that reflects ultraviolet light, a light reflection layer that reflects visible light and infrared light, and an infrared radiative layer that radiates infrared light, the radiative cooling device being configured to radiate the infrared light from its radiative surface;

wherein the ultraviolet reflection layer, the infrared radiative layer and the light reflection layer are laminated in this order as viewed from the side of the radiative surface.

With the above-described arrangement, ultraviolet light contained in light such as sunlight incident from the radiative surface side of the radiative cooling device is reflected by the ultraviolet reflection layer provided on the radiative surface side and released as such to the outside of the system, so that incidence of the ultraviolet light onto the infrared radiative layer or the light reflection layer can be avoided. Further, as the above arrangement does not necessitate provision of a multi-layered structure made of membranous layers directly on the light reflection layer, amplification of absorption of ultraviolet light in the light reflection layer due to the surface plasmon resonance can be avoided. Therefore, with the above-described arrangement, absorption of ultraviolet light can be suppressed.

Meanwhile, in the present detailed description, when a term: "light" simply is used, it is understood that within the concept of this "light", infrared light, visible light and ultraviolet light are included. In terms of wavelengths of these lights as electromagnetic waves, the concept includes electromagnetic waves having wavelengths ranging from 10 nm to 20000 nm.

Further, the lights other than ultraviolet light included within the above concept of light are reflected by the light reflection layer and released from the radiative surface to the outside of the system. And, heat input to the radiative cooling device is converted into infrared light through the infrared radiative layer and released as such from the radiative surface to the outside of the system.

In this way, with the above-described arrangement, it is possible to reflect light irradiated to the radiative cooling device and also to release heat transferred to the radiative cooling device (e.g. heat transferred from the atmosphere or a cooling object to be cooled by the radiative cooling device) as infrared light to the outside of the system.

Namely, it is possible to provide a radiative cooling device that effectively suppresses ultraviolet light absorption.

According to a further characterizing feature of the radiative cooling device relating to the present invention:

the ultraviolet reflection layer is formed by laminating two or more kinds of dielectrics;

the dielectrics are selected from any of silicon dioxide, aluminum oxide, silicon nitride, zirconium dioxide, titanium dioxide, magnesium oxide, hafnium oxide, aluminum nitride, zinc oxide and niobium pentoxide.

A substance whose dielectric property is more dominant than its conductivity is referred to as "dielectric". When dielectrics having mutually different refractive indices are superposed in multiple layers, this assembly can reflect light having a desired wavelength. As these dielectrics, silicon dioxide, aluminum oxide (sapphire), silicon nitride, zirconium dioxide, titanium dioxide, magnesium oxide, hafnium oxide, aluminum nitride, zinc oxide and niobium pentoxide are preferably used.

Moreover, when two or more kinds of dielectrics having different refractive indices are laminated as described above, this can improve the reflectance of the ultraviolet light in the ultraviolet reflection layer, advantageously. This is because the reflectance of the entire ultraviolet reflection layer is improved by utilizing the interference of the reflected lights from the boundaries of the respective dielectrics forming the ultraviolet reflection layer.

Accordingly, with the above-described arrangement, it is possible to provide a radiative cooling device that effectively suppresses ultraviolet light absorption.

According to a still further characterizing feature of the radiative cooling device relating to the present invention:

the dielectrics have a layer thickness of less than 200 nm.

With the above-described arrangement, ultraviolet light can be efficiently reflected by the ultraviolet reflection layer. The wavelength of ultraviolet light is less than about 400 nm. With a thickness of a half of this wavelength, i.e. less than 200 nm, ultraviolet light can be reflected efficiently.

Specifically, in order to increase the reflection of ultraviolet light, it is necessary to laminate a number of films having a thickness capable of obtaining an optical path length of about a quarter wavelength or about a half wavelength of the wavelength of the ultraviolet light to be reflected.

Ultraviolet light is generally defined as 10 to 400 nm in many cases, and the sunlight spectrum contains almost no light at wavelengths shorter than 300 nm. That is, when using a dielectric having a refractive index of about 1 in this wavelength range, it will be from about 75 to 100 nm or from 150 to 200 nm, and when using a dielectric having a refractive index of about 3 in that wavelength range, it will be from about 25 to 33 nm or from 50 to 66 nm.

That is, silicon dioxide, aluminum oxide (sapphire), silicon nitride, zirconium dioxide, titanium dioxide, magnesium oxide, hafnium oxide, aluminum nitride, zinc oxide, and niobium pentoxide are dielectrics suitable for a ultraviolet reflection layer having almost no UV absorption coefficient in the film thickness of several hundreds nm. Yet, in order for such dielectrics to reflect ultraviolet light in an efficient manner, the layer thickness of these dielectrics should be set less than 200 nm, preferably.

According to a still further characterizing feature of the radiative cooling device relating to the present invention:

the dielectrics of the ultraviolet reflection layer forming the radiative surface are selected from any of silicon dioxide, aluminum oxide, silicon nitride, zirconium dioxide, titanium dioxide and niobium pentoxide.

With the above-described arrangement, the weatherability of the radiative surface in direct contact with the external environment can be improved. This is because silicon dioxide, aluminum oxide, silicon nitride, zirconium dioxide, titanium dioxide, and niobium pentoxide are less susceptible to hydrolysis by moisture in the environment and these are resistant to oxidation by oxygen in the air, thus having high weatherability. Moreover, silicon dioxide, aluminum oxide, zirconium dioxide, titanium dioxide and niobium pentoxide have low oxygen mobility among oxides, and they are stable as a material (substance) with little change over time (temporarily).

According to a still further characterizing feature of the radiative cooling device relating to the present invention:

the infrared radiative layer is formed of silicon dioxide.

In radiative cooling, if the efficiency of radiation in the so-called atmospheric window region (the wavelength region of 8000 nm to 20000 nm of light) is increased, the cooling efficiency is improved. This is because absorption of the infrared radiation emitted by the radiative cooling device in the atmosphere and subsequent transfer thereof to the radiative cooling device again is prevented.

Preferred materials which transmit light and produce infrared radiation of 8000 nm to 20000 nm include silicon dioxide, aluminum oxide, magnesium oxide and hafnium dioxide. In particular, silicon dioxide has a large absorption peak near a wavelength of 10000 nm, and efficiently emits infrared radiation of a wavelength of 10000 nm, which is between 8000 nm and 20000 nm. Therefore, silicon dioxide is preferably used as a material (substance) used for the infrared radiative layer.

Namely, with the above-described arrangement, it is possible to avoid heat generation from receipt of light, and also to efficiently radiate the heat of the radiative cooling device as infrared radiation, thereby to improve the cooling performance.

According to a still further characterizing feature of the radiative cooling device relating to the present invention:

the thickness of the infrared radiative layer is more than 1 μm.

With the above-described arrangement, sufficient infrared radiation can be obtained in the infrared radiative layer, and high cooling performance can be obtained.

Incidentally, the thickness of the light reflection layer may be a thickness exceeding 1 μm, and is formed to 10000 μm or less in consideration of the economical aspect. In general, when the thickness is 20 μm to 10000 μm, favorable balance is obtained between the economic aspect and the technical aspect in terms of production or fabrication.

According to a still further characterizing feature of the radiative cooling device relating to the present invention:

the light reflecting layer is formed of silver or aluminum.

With the above-described arrangement, high reflectance can be obtained in a wide wavelength range, and heat generation can be avoided when light is received.

According to a still further characterizing feature of the radiative cooling device relating to the present invention:

the thickness of the light reflecting layer is greater than 80 nm.

With the above-described arrangement, it is possible to reflect visible light and infrared light without transmission at a wavelength of 2000 nm or less in the light reflection layer.

Incidentally, the thickness of the light reflection layer may be a thickness exceeding 80 nm, and is formed to 1000 nm or less in consideration of the economical aspect. Usually, when it is formed to a thickness of around 200 nm, favorable balance can be obtained in terms of economy, weatherability and durability.

According to a characterizing feature of a radiative cooling method relating to the present invention, the method comprising the steps of:

using a radiative cooling device comprising an ultraviolet reflection layer that reflects ultraviolet light, a light reflection layer that reflects visible light and infrared light, and an infrared radiative layer that radiates infrared light, the ultraviolet reflection layer, the infrared reflection layer and the light reflection layer being laminated in this order as viewed from the side of the radiative surface; and radiating from the radiative surface on the side opposite the side of the ultraviolet reflection layer contacting the infrared reflection layer.

With the above-described arrangement, the same effect as in the case of using the above-described radiative cooling device can be obtained.

According to a further characterizing feature of the radiative cooling method according to the present invention:

the radiative surface is directed to the sky, and the radiative surface is directed to radiate from this radiative surface directed to the sky.

With the above-described arrangement, it is possible to radiate infrared radiation which is released from the radiative surface to the outside of the system, toward the sky, namely into the universe. Therefore, it is possible to suppress the absorption of the emitted infrared radiation into the atmosphere layer and to improve the cooling performance.

DESCRIPTION OF THE INVENTION

A radiative cooling device 100 and a radiative cooling method relating embodiments of the present invention will be described based on the drawings.

Figure 1:
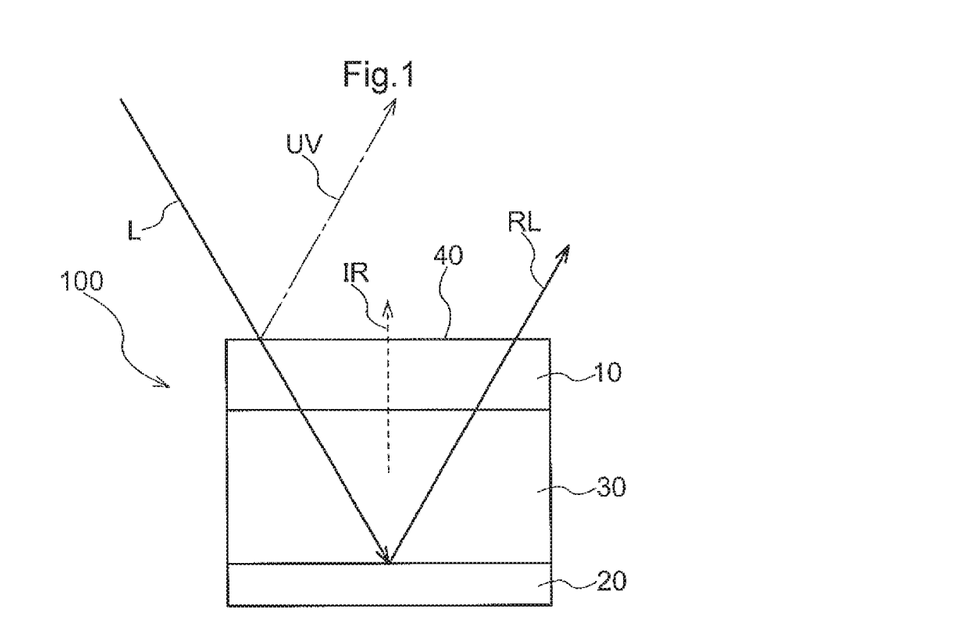
FIG. 1 is a diagram for explaining the configuration of a radiative cooling device.

The radiative cooling device 100 shown in FIG. 1 is a cooling device for obtaining a cooling effect. For example, the radiative cooling device 100 cools an object to be cooled ("cooling object": not shown).

The radiative cooling device 100 reflects light L (for example, sunlight) incident on this radiative cooling device 100, and also converts heat inputted to this radiative cooling device 100 (for example, due to heat conduction from the atmosphere or a cooling object) into infrared radiation and emitting this radiation, thus realizing a cooling effect.

Incidentally, what is referred to as "light" in this embodiment refers to electromagnetic waves having a wavelength of 10 nm to 20000 nm. That is, the light L is inclusive of ultraviolet light UV, infrared light IR and visible light VL.

As shown in FIG. 1, the radiative cooling device 100 according to the present embodiment includes an ultraviolet reflection layer 10 that reflects ultraviolet light UV, a light reflection layer 20 that reflects visible light and infrared light, and an infrared radiative layer 30 that radiates infrared light IR. The infrared light IR is radiated from a radiative surface 40.

And, in this radiative cooling device 100, as viewed from the side of the radiative surface 40, the ultraviolet reflective layer 10, the infrared radiative layer 30, and the light reflection layer 20 are laminated (stacked) in this order.

Incidentally, what is referred to as "radiative surface 40" in the instant embodiment refers to the surface of the ultraviolet reflection layer 10 located opposite to its surface placed in contact with the infrared radiative layer 30.

That is, with a radiative cooling method relating to this embodiment, the ultraviolet reflection layer 10 that reflects ultraviolet light UV, the light reflection layer 20 that reflects visible light and infrared light, and the infrared radiative layer 30 that radiates the infrared light IR are laminated (stacked) in the order of the ultraviolet reflection layer 10, the infrared radiative layer 30 and the light reflection layer 20. And, the infrared light IR is radiated from the radiative surface 40 disposed on the opposite side to the surface of the ultraviolet reflection layer 10 in contact with the infrared radiative layer 30.

Figure 2:
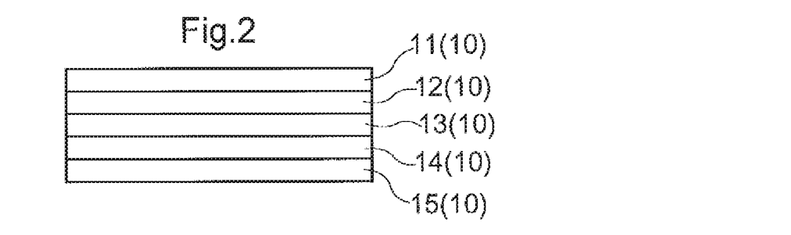
FIG. 2 is a diagram for explaining an arrangement of an ultraviolet reflection layer.

The ultraviolet reflection layer 10 is a layer made of a dielectric which has an optical structure that reflects ultraviolet light UV and transmits visible light VL and infrared light IR. In the instant embodiment, the ultraviolet reflection layer 10 is formed by laminating two or more kinds of dielectrics, as shown in FIG. 2. The ultraviolet reflective layer 10 shown in FIG. 2 has dielectric layers 11-15 laminated (stacked) on top of each other as layers made of dielectrics.

One surface of the ultraviolet reflection layer 10 is in gapless (close) contact with the infrared radiative layer 30.

In the present embodiment, what is referred to as "ultraviolet light UV" means an electromagnetic wave having a wavelength of 10 nm to 400 nm. Further, in the present embodiment, the "infrared light IR" refers to an electromagnetic wave having a wavelength of about 700 nm to 20000 nm. Further, in the present embodiment, the "visible light VL" refers to an electromagnetic wave having a wavelength of approximately 400 nm to 700 nm.

As a dielectric of the ultraviolet reflective layer 10, any one of silicon dioxide ($SiO_2$), aluminum oxide (sapphire), silicon nitride (SiN), zirconium dioxide ($ZrO_2$), titanium dioxide ($TiO_2$), magnesium oxide (MgO), hafnium oxide ($HfO_2$) And aluminum nitride (AlN), zinc oxide (ZnO), and niobium pentoxide ($Nb_2O_5$) will be selected.

The dielectrics of the ultraviolet reflective layer 10 are each in the form of a film of less than 200 nm. This film-like layer can be formed, for example, by the so-called CVD method or sputtering method, but there is no limitation on its formation method.

The surface of the ultraviolet reflective layer 10 on the opposite side to its surface in contact with the infrared radiative layer 30, that is, the surface on the side open (exposed) to the atmosphere functions also as a "radiative surface 40" that radiates infrared light IR in the radiative cooling device 100. Namely, of the dielectric layer disposed on the opposite side (the other end side) to the side of the ultraviolet reflection layer 10 placed in contact with the infrared reflection layer 30, the surface of this layer exposed to the atmosphere constitutes the radiative surface 40. In other words, of the ultraviolet reflection layer 10, the surface of the dielectric layer exposed to the atmosphere forms the radiative surface 40 of the radiative cooling device 100.

The dielectric layer 11 forming the radiative surface 40 is made of a material (substance) selected from any of silicon dioxide, aluminum oxide, silicon nitride and zirconium dioxide. FIG. 2 shows a case in which this dielectric layer 11 is formed of sapphire as aluminum oxide.

FIG. 2 illustrates a case in which the dielectric layers 11-15 in FIG. 2 are made of sapphire, silicon dioxide, sapphire, silicon dioxide and sapphire in this order.

Moreover, in FIG. 2, there is illustrated, as a specific example, a case in which the thickness (layer thickness) of the dielectric is less than 200 nm, the thicknesses of the dielectric layers 11-15 are 30 nm, 50 nm, 50 nm, 40 nm, and 40 nm respectively in this order.

Figure 7:
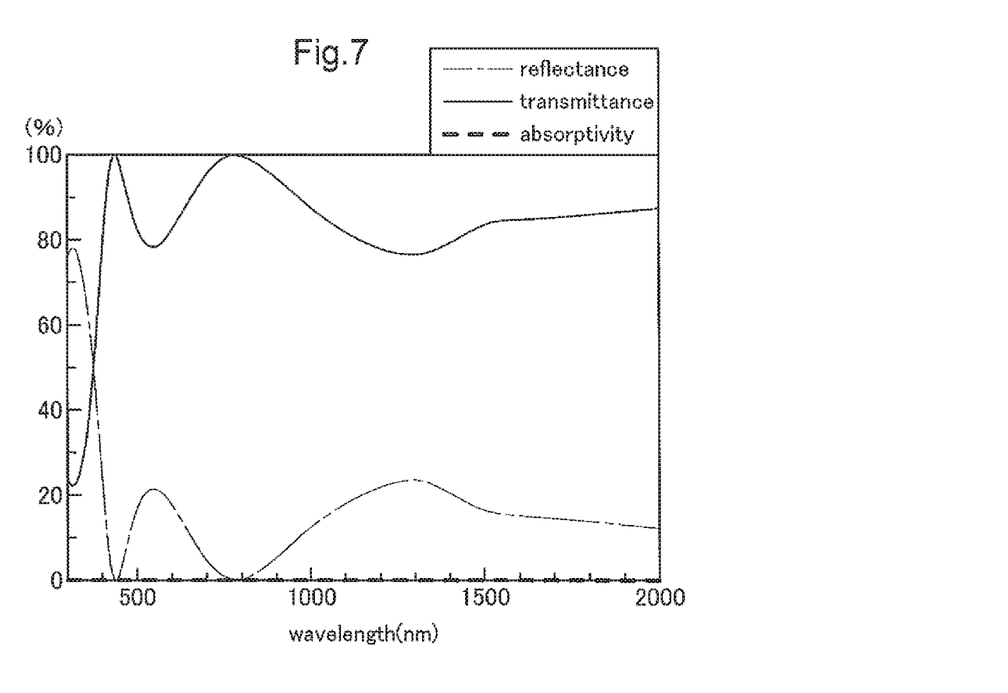
FIG. 7 is a diagram showing the reflectance, the transmittance, and the absorptivity of the ultraviolet reflection layer.
Figure 8:
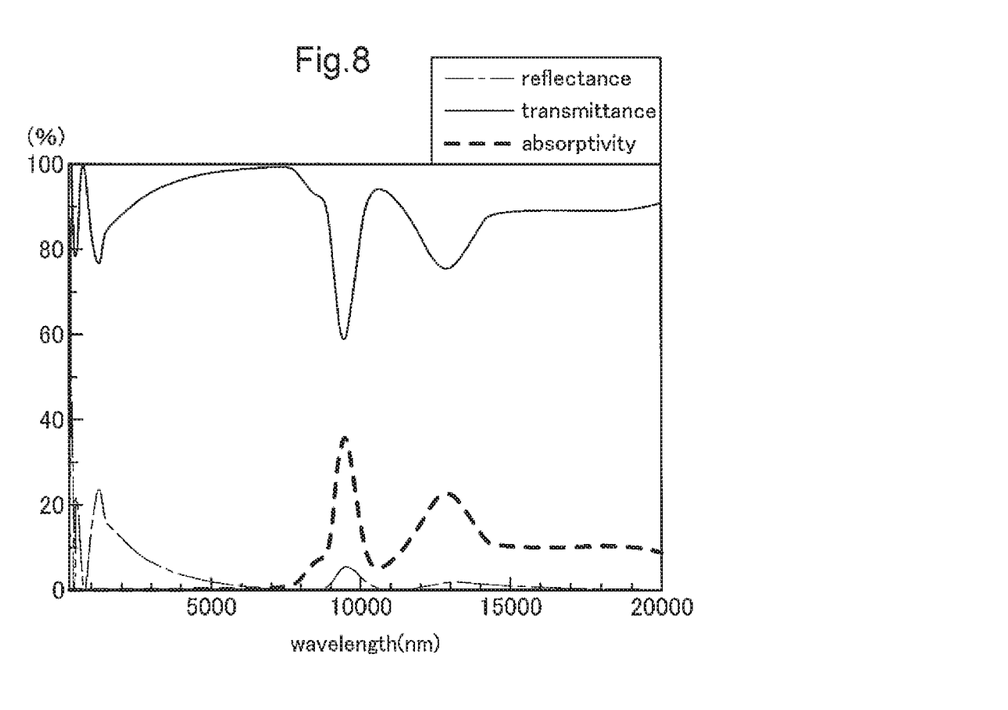
FIG. 8 is a diagram showing the reflectance, the transmittance, and the absorptivity of the ultraviolet reflection layer.

Incidentally, FIG. 7 and FIG. 8 show the reflectance, the transmittance, and the absorptivity of the ultraviolet reflection layer 10 shown in FIG. 2. The ultraviolet reflection layer 10 has a high absorptivity in a wavelength range around 10000 nm corresponding to the window of the atmosphere, thus radiates infrared light in a wavelength range around 10000 nm.

The infrared radiative layer 30 is a layer that transmits the light L and radiates infrared light IR.

One surface of the infrared radiative layer 30 is in close contact with the ultraviolet reflection layer 10, and the other surface thereof is in close contact with the light reflection layer 20.

Incidentally, the description of "transmits light" etc. in the instant embodiment is understood to be inclusive of a case in which part of the light is absorbed and reflected and most of the light is transmitted. For example, when 90% or more of the energy of incident light is transmitted, this will be described simply as "transmits light", etc.

The infrared radiative layer 30 is coupled to the ultraviolet reflection layer 10 and the light reflection layer 20 so as to be thermally conductive therewith. Namely, the infrared radiative layer 30 converts the heat energy of its own, heat inputted from the ultraviolet reflection layer 10 (heat energy), as well as heat inputted from the light reflection layer 20 (thermal energy) into infrared light IR and radiates this infrared light IR.

In the instant embodiment, the infrared radiative layer 30 is made of silicon dioxide which transmits the light L and efficiently radiates infrared light IR around a wavelength of 10000 nm in the window region of the atmosphere between wavelengths 8000 nm and 20000 nm.

The infrared radiative layer 30 is formed to have a thickness of more than 1 μm. Normally, the thickness of the infrared radiative layer 30 may be more than 1 μm, and it is economical to set it to about 10000 μm or less, and in particular, favorable balance between the economic aspect and performance aspect can be obtained when it is set in the range of 20 μm or more to 10000 μm or less.

Figure 3:
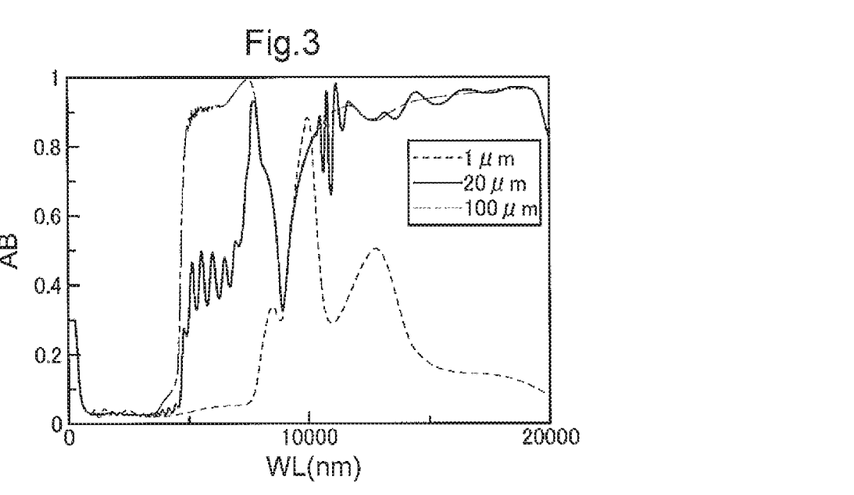
FIG. 3 shows emission spectra of infrared radiative layers of different layer thicknesses.

FIG. 3 shows the radiation spectrum of the infrared radiative layer 30 when the layer thickness (thickness) of the infrared radiative layer 30 made of silicon dioxide is 1 μm, 20 μm, and 100 μm, respectively. The vertical axis represents the light absorptivity AB of the infrared radiative layer 30, and the horizontal axis represents its wavelength WL. Incidentally, the 1 μm infrared radiative layer 30 of silicon dioxide is a film-like layer prepared by sputtering, and the 20 μm and 100 μm infrared radiative layers 30 of silicon dioxide are layers formed by melting and solidification.

Incidentally, according to Kirchhoff's law, the absorptivity of light at an arbitrary wavelength is equal to the emissivity of light. Thus, the distribution shown by the absorptivity AB of the infrared radiative layer 30 in FIG. 3 is equal to the distribution of the intensity of the radiative light in case radiated by the infrared radiative layer 30.

The light reflection layer 20 is a layer made of a metal that reflects the light L, and is a layer that functions as a so-called "mirror".

In the instant embodiment, the light reflection layer 20 is formed of either silver or aluminum as a "metal". In the present embodiment, there is described a case where the light reflection layer 20 is formed of silver.

The light reflecting layer 20 to be used is formed to be thicker than 80 nm.

This is because if the light reflection layer 20 had a film thickness of 80 nm or less, transmission would start to occur in a wavelength range of wavelength 2000 nm or less, thus being unable to achieve the light reflection performance.

Incidentally, if the thickness of the light reflecting layer 20 exceeded 80 nm, transmission of light would not occur, and no change would occur in the reflectance of light. Namely, there is no technical upper limit regarding the thickness of the light reflection layer 20. However, in terms of economic aspect, it will suffice for the thickness of the light reflecting layer 20 to be 1 mm or less.

Incidentally, FIG. 1 shows, as a specific example where the light reflection layer 20 has a thickness exceeding 80 nm, a case wherein the light reflection layer 20 comprises silver having a thickness of 200 nm.

DESCRIPTION OF EXAMPLES

Next, examples of this embodiment will be explained.

Example 1, Example 2 and Example 3 to be described below respectively relate to an embodiment of the radiative cooling device 100 according to the instant embodiment having the configuration shown in FIG. 1. In this radiative cooling device 100, as described hereinbefore, as viewed from the side of the radiative surface 40, the ultraviolet reflection layer 10, the infrared radiative layer 30, and the light reflection layer 20 are laminated in this order.

Figure 4:
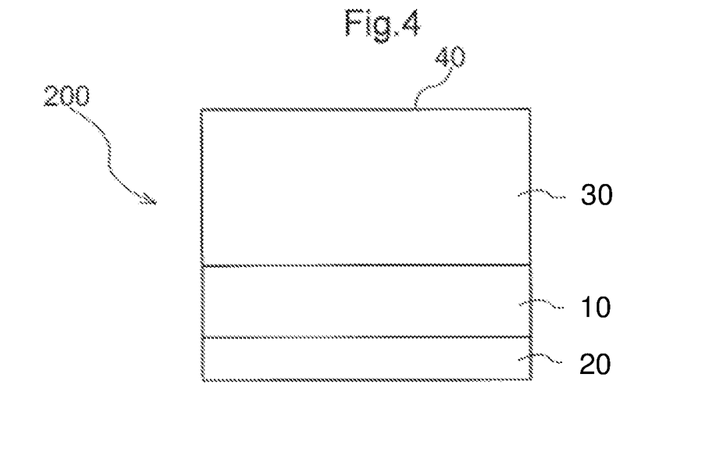
FIG. 4 is a diagram for explaining the configuration of a conventional radiative cooling device.

On the other hand, Comparative Example 1 and Comparative Example 2 described below respectively relate to a conventional radiative cooling device 200 having the structure shown in FIG. 4. In this radiative cooling device 200, as viewed from the radiative surface 40 side, the infrared radiative layer 30, the ultraviolet reflection layer 10, and the light reflection layer 20 are laminated in this order.

In the following, comparisons will be made between the radiative cooling device 100 of Example 1, Example 2 and Example 3 and the conventional radiative cooling device 200 of Comparative Example 1 and Comparative Example 2, in the case of the ambient temperature being 30° C.

In any one of Example 1, Example 2, Example 3, Comparative Example 1 and Comparative Example 2, the radiative surface 40 of the radiative cooling device 100 or the radiative cooling device 200 is directed to the sky (empty, space) and the radiative surface 40 is placed vertically upwards.

In any of Example 1, Example 2, Example 3, Comparative Example 1 and Comparative Example 2, sunlight as light is placed in an environment where it is incident at an energy of about 1000 W/m² from the vertical direction of the material. Sunlight is incident on the radiative cooling device 100 or the radiative cooling device 200 mainly from its radiative surface 40.

Tables 1 through Table 5 show comparison of cooling performances in Example 1, Example 2, Example 3, Comparative Example 1 and Comparative Example 2.

Table 1 shows the cooling performance in the case of Example 1.

Table 2 shows the cooling performance in the case of Example 2.

Table 3 shows the cooling performance in the case of Example 3.

Table 4 shows the cooling performance in the case of Comparative Example 1.

Table 5 shows the cooling performance in the case of Comparative Example 2.

Incidentally, items shown in Tables 1 to 5 are the same.

The configuration common to the radiative cooling devices 100 of Example 1, Example 2, Example 3, Comparative Example 1 and Comparative Example 2 will be explained.

The light reflecting layer 20 is compared in the following configuration.

The light reflecting layers 20 of Example 1, Example 2, Example 3, Comparative Example 1 and Comparative Example 2 are all made of a silver layer having a thickness of 200 nm.

The description of the light reflection layers 20 will be omitted below.

The infrared radiative layer 30 is compared in the following configuration.

The materials (substances) forming the infrared radiative layers 30 of Example 1, Example 2, Example 3, Comparative Example 1 and Comparative Example 2 are all silicon dioxide.

Comparisons will be made in case the thickness of the infrared radiative layers 30 are 1 μm, 10 μm, 20 μm, 100 μm, 1000 μm, 10000 μm, 100000 μm, respectively in Example 1, Example 2, Example 3, Comparative Example 1 and Comparative Example 2. Incidentally, the infrared radiative layer 30 of silicone dioxide of 1 μm and 10 μm are film-like layers produced by sputtering. The infrared radiative layer 30 of silicone dioxide of 20 μm, 100 μm, 1000 μm, 10000 μm and 100000 μm are layers formed by melting and solidification.

In the following, discussion regarding the infrared radiative layer 30 will be omitted.

Next, only different configuration portions of Example 1, Example 2, Example 3, Comparative Example 1 and Comparative Example 2 will be explained.

Example 1

The radiative cooling device 100 of Example 1 has the following configuration.

The ultraviolet reflection layer 10, as shown in FIG. 2, is formed by laminating the dielectric layers 11-15 as layers made of dielectrics.

The dielectric layers 11-15 are respectively made of sapphire, silicon dioxide, sapphire, silicon dioxide and sapphire in this order.

Further, the thicknesses of the dielectric layers 11-15 are 30 nm, 50 nm, 50 nm, 40 nm, and 40 nm, respectively in this order.

Example 2

The radiative cooling device 100 of Example 2 has the following configuration.

Example 2 differs from Example 1 in the respect of the laminated structure of the ultraviolet reflection layer 10.

Figure 5:
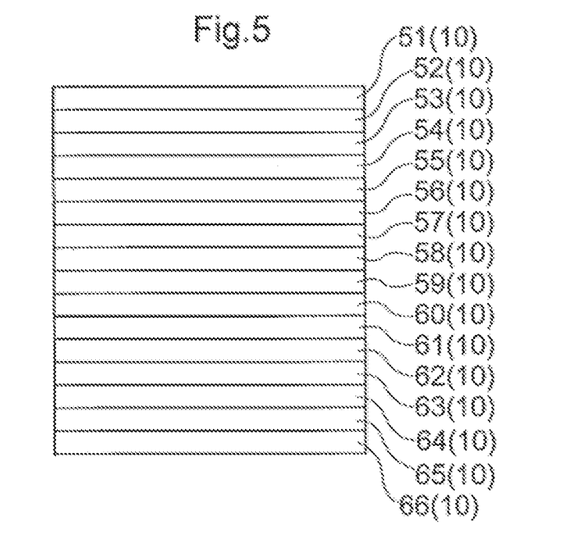
FIG. 5 is a view for explaining another arrangement of the ultraviolet reflection layer.

The ultraviolet reflective layer 10, as shown in FIG. 5, is provided with dielectric layers 51-56 as layers made of dielectrics.

The dielectric layers 51-66 are formed by laminating silicon dioxide and titanium dioxide alternately in 16 (sixteen) layers.

The thicknesses of the dielectric layers 51-66 are 100 nm, 33 nm, 65 nm, 13 nm, 80 nm, 37 nm, 23 nm, 46 nm, 180 nm, 106 nm, 172 nm, 88 nm, 172 nm, 104 nm, 175 nm, and 103 nm respectively in this order.

Example 3

Example 3 differs from Example 1 and Example 2 in the respect of the laminated structure of the ultraviolet reflection layer 10.

Figure 6:
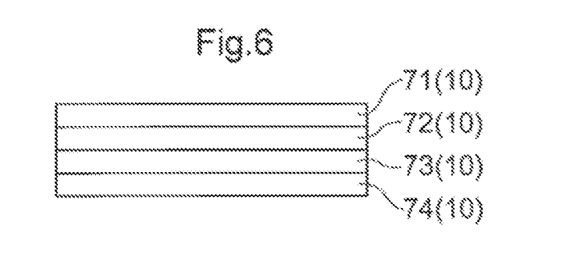
FIG. 6 is a view for explaining still another arrangement of the ultraviolet reflection layer.

The ultraviolet reflection layer 10, as shown in FIG. 6, is provided with dielectric layers 71-74 as layers made of dielectrics.

The dielectric layers 71-74 are formed by laminating silicon dioxide and niobium pentoxide alternately in 4 (four) layers.

The thicknesses of the dielectric layers 71-74 are 111 nm, 25 nm, 56 nm, and 29 nm, respectively in this order.

Figure 9:
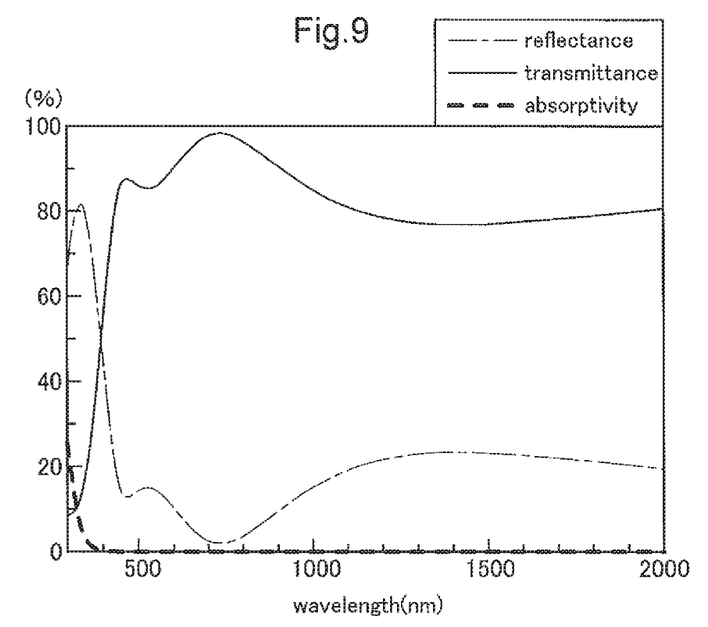
FIG. 9 is a diagram showing the reflectance, the transmittance, and the absorptivity of the ultraviolet reflective layer of another arrangement.
Figure 10:
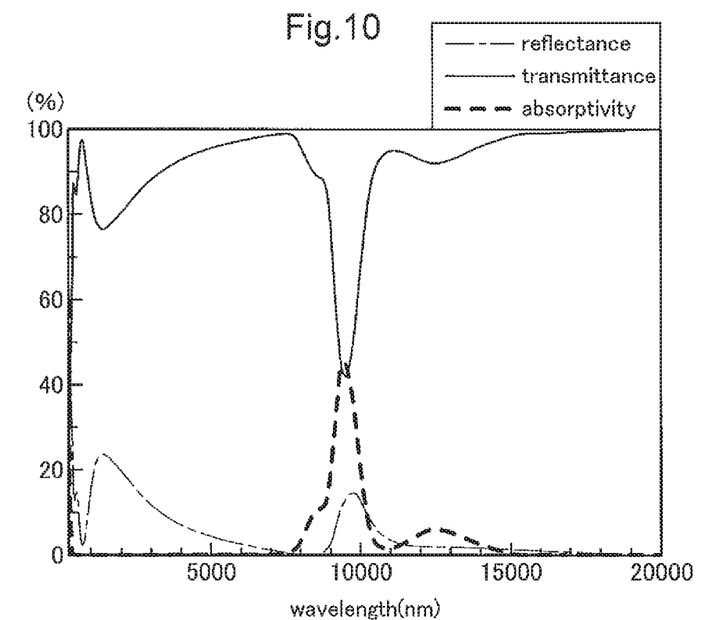
FIG. 10 is a diagram showing the reflectance, the transmittance, and the absorptivity of the ultraviolet reflection layer of another arrangement.

Incidentally, FIG. 9 and FIG. 10 show the reflectance, the transmittance, and the absorptivity of the ultraviolet reflection layer 10 shown in FIG. 6. The ultraviolet reflection layer 10 has a high absorptivity in a wavelength range around 10000 nm corresponding to the window of the atmosphere, thus radiating infrared light in a wavelength range around 10000 nm.

Comparative Example 1

The radiative cooling device 200 of Comparative Example 1 includes the ultraviolet reflective layer 10 having the same laminated structure as that of Example 1.

The radiative cooling device 200 of Comparative Example 1 differs from the case of Example 1 in the position where the ultraviolet reflective layer 10 is disposed.

Comparative Example 2

The radiative cooling device 200 of Comparative Example 2 includes the ultraviolet reflective layer 10 having the same laminated structure as that of Example 2.

The radiative cooling device 200 of Comparative Example 2 differs from the case of Example 2 in the position where the ultraviolet reflective layer 10 is disposed.

The following P1 to P4 in Tables 1 to 5 show the following characteristics of the radiative cooling device 100 or the radiative cooling device 200.

t: thickness of infrared radiative layer 30 (μm)

P1: density of energy of radiation (W/m$^2$)

P2: density of energy of heat input from sunlight (W/m$^2$)

P3: density of energy of heat input from atmosphere (W/m$^2$)

P4: energy density of cooling capacity (W/m$^2$)

T: equilibrium temperature (° C.) of radiative cooling device 100 or radiative cooling device 200

Incidentally, the above-mentioned "density" means the density of the in/out of the energy with respect to the area of the surface of the radiative surface 40.

Further, P2 means the energy which was not reflected by radiative cooling device 100 or radiative cooling device 200 of the energy of the sunlight which was incident with energy of about 1000 W/m$^2$.

Further, the value of P4 is a value obtained by subtracting the sum of the values of P2 and P3 from the value of P1.

The values of P1 and P3 are calculated assuming that the radiation angle with respect to the radiative surface 40 is 60 degrees.

TABLE 1

| t (μm) | P1 (W/m²) | P2 (W/m²) | P3 (W/m²) | P4 (W/m²) | T (° C.) |
|---|---|---|---|---|---|
| 1 | 62.4 | 51.4 | 31.6 | −20.6 | 52.5 |
| 10 | 136.7 | 52.3 | 83.0 | 1.4 | 29.0 |
| 20 | 192.8 | 52.1 | 133.2 | 7.5 | 27.0 |
| 100 | 207.0 | 51.5 | 145.8 | 9.6 | 26.0 |
| 1000 | 209.5 | 52.2 | 147.9 | 9.4 | 26.5 |
| 10000 | 210.2 | 54.4 | 148.3 | 7.4 | 27.0 |
| 100000 | 210.3 | 52.8 | 148.4 | 9.1 | 26.5 |

TABLE 2

| t (μm) | P1 (W/m²) | P2 (W/m²) | P3 (W/m²) | P4 (W/m²) | T (° C.) |
|---|---|---|---|---|---|
| 1 | 70.9 | 51.6 | 37.0 | −17.8 | 47.5 |
| 10 | 156.2 | 52.2 | 97.7 | 6.3 | 26.5 |
| 20 | 193.2 | 52.8 | 130.4 | 10.0 | 25.5 |
| 100 | 203.1 | 52.8 | 139.0 | 11.4 | 25.5 |
| 1000 | 205.5 | 50.7 | 140.9 | 13.9 | 24.5 |
| 10000 | 206.1 | 55.7 | 141.3 | 9.0 | 26.5 |
| 100000 | 206.2 | 55.0 | 141.4 | 9.8 | 26.5 |

TABLE 3

| t (μm) | P1 (W/m²) | P2 (W/m²) | P3 (W/m²) | P4 (W/m²) | T (° C.) |
|---|---|---|---|---|---|
| 1 | 142.2 | 38.4 | 103.0 | 0.9 | 29.5 |
| 10 | 159.7 | 38.9 | 111.2 | 9.6 | 25.0 |
| 20 | 196.6 | 39.1 | 132.0 | 25.5 | 19.0 |
| 100 | 205.4 | 39.1 | 139.7 | 26.6 | 19.0 |
| 1000 | 206.5 | 33.4 | 141.5 | 31.6 | 18.0 |
| 10000 | 208.1 | 34.1 | 142.0 | 32.0 | 18.0 |
| 100000 | 208.3 | 34.1 | 142.3 | 31.9 | 18.0 |

TABLE 4

| t (μm) | P1 (W/m²) | P2 (W/m²) | P3 (W/m²) | P4 (W/m²) | T (° C.) |
|---|---|---|---|---|---|
| 1 | 44.0 | 66.9 | 17.9 | −40.9 | 82.0 |
| 10 | 130.8 | 69.2 | 77.6 | −16.0 | 39.5 |
| 20 | 193.8 | 66.4 | 134.0 | −6.6 | 33.0 |
| 100 | 208.4 | 66.4 | 146.9 | −5.0 | 32.0 |
| 1000 | 210.8 | 66.6 | 148.9 | −4.7 | 31.5 |
| 10000 | 211.5 | 69.7 | 149.4 | −7.5 | 32.5 |
| 100000 | 211.6 | 70.2 | 149.4 | −8.1 | 33.0 |

TABLE 5

| t (μm) | P1 (W/m²) | P2 (W/m²) | P3 (W/m²) | P4 (W/m²) | T (° C.) |
|---|---|---|---|---|---|
| 1 | 83.0 | 65.7 | 47.6 | −30.4 | 55.5 |
| 10 | 156.2 | 68.0 | 100.3 | −12.1 | 36.5 |
| 20 | 196.7 | 66.0 | 136.7 | −6.0 | 32.5 |
| 100 | 208.4 | 65.3 | 146.9 | −3.8 | 31.5 |
| 1000 | 210.8 | 67.1 | 148.9 | −5.2 | 32.0 |
| 10000 | 211.5 | 68.1 | 149.4 | −5.9 | 32.0 |
| 100000 | 211.6 | 68.8 | 149.4 | −6.6 | 32.5 |

With reference to Tables 1 to 5, it may be seen that the radiative cooling devices 100 of Example 1, Example 2 and Example 3 have higher cooling abilities than the radiative cooling devices 200 of Comparative Example 1 and Comparative Example 2.

Therefore, it may be judged that the cooling ability is higher in the case of laminating the ultraviolet reflective layer 10, the infrared radiative layer 30, and the light reflective layer 20 in this order as viewed from the radiative surface 40 side as provided in the radiative cooling device 100 than the case of laminating the infrared radiative layer 30, the ultraviolet reflection layer 10, and the light reflection layer 20 in this order from the side of the radiative surface 40 as provided in the radiative cooling device 200.

Namely, it is believed that above difference in the cooling ability between the radiative cooling device 100 according to the present embodiment and the conventional radiative cooling device 200 is attributable to suppression of absorption of ultraviolet light in the case of the radiative cooling device 100 according to the present embodiment.

With comparison among Table 1 of Example 1, Table 2 of Example 2, and Table 3 of Example 3, it can be said that good cooling ability can be achieved regardless of the number of laminated layers as long as appropriate lamination of layers of dielectrics of the ultraviolet reflection layer 10 is ensured. Further, it may be understood that the cooling ability tends to improve with increase in the number of laminated layers if the material (substance) forming the ultraviolet reflection layer 10 remains the same.

With comparison among Table 1 of Example 1, Table 2 of Example 2, and Table 3 of Example 3, it can be seen the sufficient cooling ability can be achieved when the thickness of the infrared radiative layer 30 is 1 μm or more, preferably more than 1 μm. Especially, it can be seen that particularly good cooling performance is achieved when the thickness of the infrared radiative layer 30 is 10 μm or more.

Further, it is assumed that good cooling performance is achieved even when the thickness of the infrared radiative layer 30 reaches 100,000 μm, and good cooling performance is achieved even when the thickness of the infrared radiative layer 30 exceeds 100,000 μm. However, normally, 100,000 μm will be sufficient as the thickness of the infrared radiative layer 30.

As described above, it is possible to provide a radiative cooling device and a radiative cooling method that suppress absorption of ultraviolet light.

FURTHER EMBODIMENTS (1) In the foregoing embodiment, there was disclosed the case of the dielectric layer of the ultraviolet reflection layer 10 consisting of 5 layers and the case of it consisting of 16 layers. However, the number of laminated layers of the dielectric layers of the ultraviolet reflection layer 10 is not limited thereto.

It will suffice the dielectric layer(s) of the ultraviolet reflection layer 10 consist of one or more layer(s), preferably two or more, of different dielectrics. Moreover, the number of layers of the dielectric of the ultraviolet reflective layer 10 may be even or odd.

(2) In the foregoing embodiment, there was disclosed the case in which the light reflection layer 20 is made of silver. However, similar advantageous effects can be achieved also when the light reflection layer 20 is made of aluminum or gold.

(3) In the foregoing embodiment, there was disclosed the case in which the dielectric layer having the radiative surface 40 in the ultraviolet reflection layer 10 is made of silicon dioxide or aluminum oxide.

However, the dielectric layer having the radiative surface 40 may be made of silicon nitride, zirconium dioxide or titanium dioxide.

(4) In the foregoing embodiment, there was disclosed the case in which the layer made of a dielectric in the ultraviolet reflection layer 10 is made of silicon dioxide, aluminum oxide, or titanium dioxide.

However, the material (substance) for forming the dielectric layer in the ultraviolet reflective layer 10 may be silicon nitride, zirconium dioxide, titanium dioxide, magnesium oxide, hafnium oxide, aluminum nitride, zinc oxide, niobium pentoxide. Moreover, the combination of the materials (substances) which form the respective dielectric layers in the ultraviolet reflective layer 10 is not restricted to the range described in the foregoing embodiment.

(5) In the foregoing embodiment, there was disclosed the case in which the material forming the infrared radiative layer 30 is silicon dioxide. However, as the material forming the infrared radiative layer 30, any other material such as "TEMPAX" (a registered trademark, same below), which is borosilicate glass, may be used also.

Figure 11:
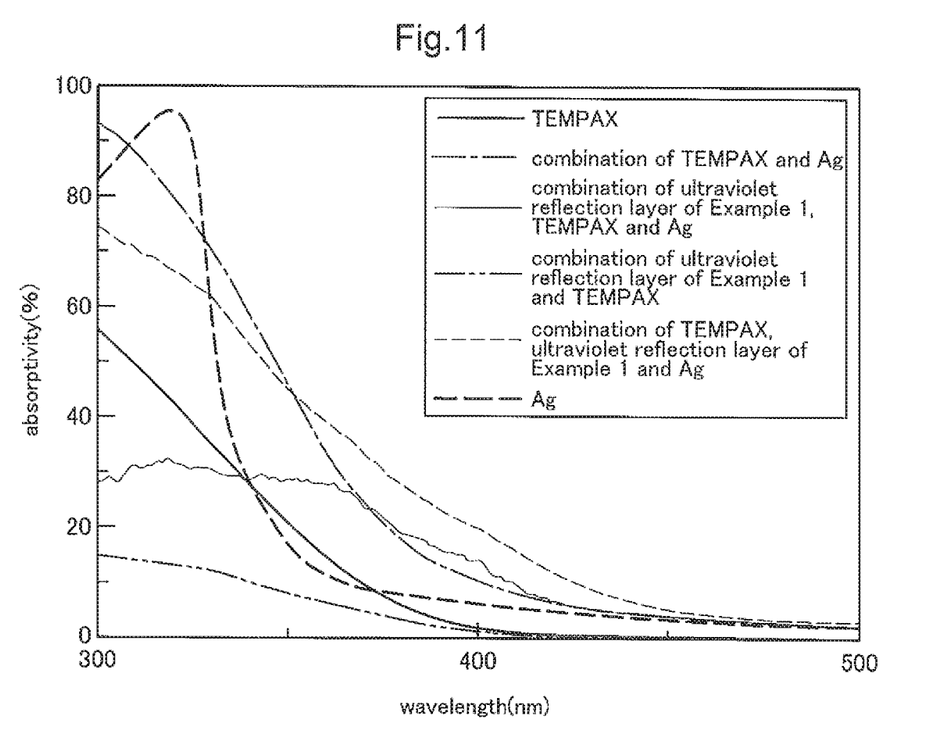
FIG. 11 is a diagram showing the relationship between the wavelength and the absorptivity relating to TEMPAX®.

Incidentally, in FIG. 11, there are shown respectively the relationship between the wavelength and the absorptivity with respect to TEMPAX, that is, the absorptivity of TEMPAX (thick solid line), the absorptivity in the case where TEMPAX and silver as light reflecting layer 20 are laminated (one-dot chain line), the absorptivity of the case in which the ultraviolet reflection layer of Example 1, the TEMPAX and the silver as the light reflection layer 20 are laminated in the form of the present invention (thin solid line), the absorptivity of the case in which the ultraviolet ray reflection layer of Example 1 and TEMPAX are laminated (two-dot chain line), the absorptivity of the case in which TEMPAX, the ultraviolet reflection layer of Example 1 and silver as the light reflection layer 20 are laminated in the conventional form (thin broken line) and the absorptivity of silver (thick broken line).

Incidentally, the configurations disclosed in the above-described embodiments (including the further embodiments, and the same hereinafter) can be applied in combination with the configurations disclosed in the other embodiment(s) as long as no contradiction results from such combination(s). The embodiments disclosed in the present specification are merely exemplary, and the embodiments of the present invention are not limited thereto, but can be modified appropriately without departing from the subject of the present invention.

INDUSTRIAL APPLICABILITY

The present invention is applicable to a radiative cooling device and a radiative cooling method that suppress absorption of ultraviolet light.

DESCRIPTION OF SIGNS

10: ultraviolet reflection layer
11: dielectric layer (dielectric, ultraviolet reflection layer)
12: dielectric layer (dielectric, ultraviolet reflection layer)
13: dielectric layer (dielectric, ultraviolet reflection layer)
14: dielectric layer (dielectric, ultraviolet reflection layer)
15: dielectric layer (dielectric, ultraviolet reflection layer)
20: light reflection layer
30: infrared radiative layer
40: radiative surface
51: dielectric layer (dielectric, ultraviolet reflection layer)
52: dielectric layer (dielectric, ultraviolet reflection layer)
53: dielectric layer (dielectric, ultraviolet reflection layer)
54: dielectric layer (dielectric, ultraviolet reflection layer)
55: dielectric layer (dielectric, ultraviolet reflection layer)
56: dielectric layer (dielectric, ultraviolet reflection layer)
57: dielectric layer (dielectric, ultraviolet reflection layer)
58: dielectric layer (dielectric, ultraviolet reflection layer)
59: dielectric layer (dielectric, ultraviolet reflection layer)
60: dielectric layer (dielectric, ultraviolet reflection layer)
61: dielectric layer (dielectric, ultraviolet reflection layer)
62: dielectric layer (dielectric, ultraviolet reflection layer)
63: dielectric layer (dielectric, ultraviolet reflection layer)
64: dielectric layer (dielectric, ultraviolet reflection layer)
65: dielectric layer (dielectric, ultraviolet reflection layer)
66: dielectric layer (dielectric, ultraviolet reflection layer)
71: dielectric layer (dielectric, ultraviolet reflection layer)
72: dielectric layer (dielectric, ultraviolet reflection layer)
73: dielectric layer (dielectric, ultraviolet reflection layer)
74: dielectric layer (dielectric, ultraviolet reflection layer)
100: radiative cooling device
200: radiative cooling device
200 nm: thickness
IR: infrared light
L: light
UV: ultraviolet light
VL: visible light

The invention claimed is:

1. A radiative cooling device comprising an ultraviolet reflection layer that reflects ultraviolet light, a light reflection layer that reflects visible light and infrared light, and an infrared radiative layer that radiates infrared light, the radiative cooling device having a radiative surface and being configured to radiate the infrared light from the radiative surface;
   wherein the ultraviolet reflection layer, the infrared radiative layer and the light reflection layer are laminated in this order as viewed from a side of the radiative surface;
   wherein the thickness of the infrared radiative layer lies in the range of 20 μm or more to 10000 μm or less; and
   wherein the infrared radiative layer is formed of silicon dioxide.

2. The radiative cooling device of claim 1, wherein:
   the ultraviolet reflection layer is formed by laminating two or more kinds of dielectrics; and
   the dielectrics are selected from the group consisting of silicon dioxide, aluminum oxide, silicon nitride, zirconium dioxide, titanium dioxide, magnesium oxide, hafnium oxide, aluminum nitride, zinc oxide and niobium pentoxide.

3. The radiative cooling device of claim 2, wherein the dielectrics each have a layer thickness of less than 200 nm.

4. The radiative cooling device of claim 3, wherein the dielectrics of the ultraviolet reflection layer forming the radiative surface are selected from the group consisting of silicon dioxide, aluminum oxide, silicon nitride, zirconium dioxide, titanium dioxide and niobium pentoxide.

5. The radiative cooling device of claim 3, wherein the light reflecting layer is formed of silver or aluminum.

6. The radiative cooling device of claim 2, wherein the dielectrics of the ultraviolet reflection layer forming the radiative surface are selected from the group consisting of silicon dioxide, aluminum oxide, silicon nitride, zirconium dioxide, titanium dioxide and niobium pentoxide.

7. The radiative cooling device of claim 6, wherein the light reflecting layer is formed of silver or aluminum.

8. The radiative cooling device of claim 2, wherein the light reflecting layer is formed of silver or aluminum.

9. The radiative cooling device of claim 1, wherein the light reflecting layer is formed of silver or aluminum.

10. The radiative cooling device of claim 1, wherein the light reflecting layer is formed of silver or aluminum.

11. The radiative cooling device of claim 10, wherein the thickness of the light reflecting layer is greater than 80 nm.

12. A radiative cooling method, the method comprising the steps of:

using a radiative cooling device comprising an ultraviolet reflection layer that reflects ultraviolet light, a light reflection layer that reflects visible light and infrared light, and an infrared radiative layer that radiates infrared light, wherein the infrared radiative layer is formed of silicon dioxide, the ultraviolet reflection layer, the infrared radiative layer and the light reflection layer being laminated in this order as viewed from a side of a radiative surface of the radiative cooling device, the thickness of the infrared radiative layer lying in the range of 20 μm or more to 10000 μm or less; and radiating from the radiative surface on a side opposite a side of the ultraviolet reflection layer contacting the infrared reflection layer.

13. The radiative cooling method of claim 12, wherein the radiative surface is directed to the sky, and the radiative surface is directed to radiate from this radiative surface directed to the sky.

\* \* \* \* \*

UNITED STATES PATENT AND TRADEMARK OFFICE
CERTIFICATE OF CORRECTION

| | | |
|---|---|---|
| PATENT NO. | : 11,598,592 B2 | |
| APPLICATION NO. | : 16/494389 | |
| DATED | : March 7, 2023 | |
| INVENTOR(S) | : Masahiro Suemitsu et al. | |

It is certified that error appears in the above-identified patent and that said Letters Patent is hereby corrected as shown below:

In the Claims

Column 15, Line 1, Claim 9, delete "claim 1" and insert -- claim 4 --

Signed and Sealed this
Twentieth Day of August, 2024

Katherine Kelly Vidal
*Director of the United States Patent and Trademark Office*